Oct. 30, 1934.   H. O. VOGT   1,978,825
CONVEX CRYSTAL AND METHOD OF MAKING SAME
Filed Dec. 12, 1932
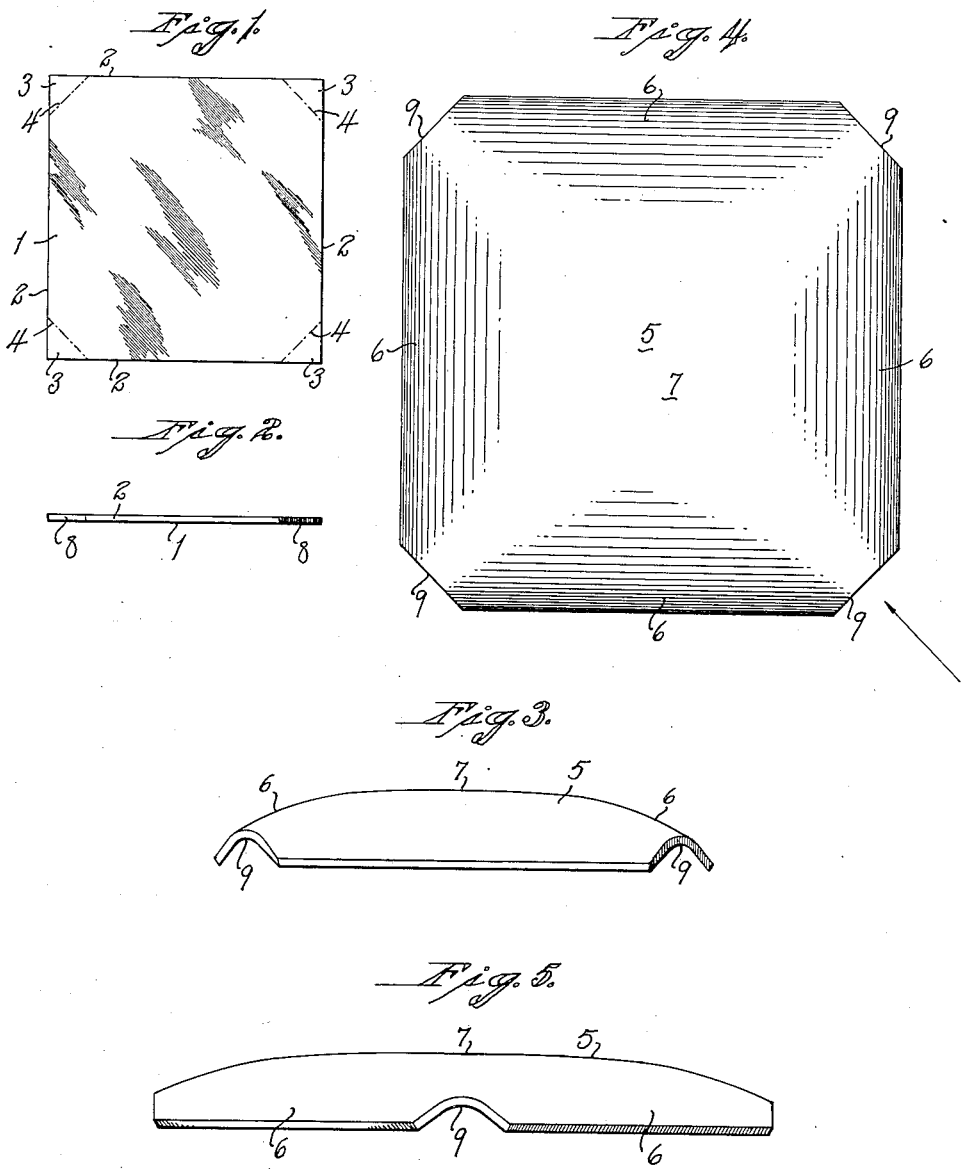
Inventor
Henry Otto Vogt Patented Oct. 30, 1934

1,978,825

UNITED STATES PATENT OFFICE 1,978,825

CONVEX CRYSTAL AND METHOD OF MAKING SAME

Henry Otto Vogt, Thomaston, Conn., assignor to The E. Ingraham Company, Bristol, Conn., a corporation Application December 12, 1932, Serial No. 646,858

4 Claims. (Cl. 58—91)

This invention relates to improvements in crystals of the type used for time instruments and the like, and more particularly to polygonal convex crystals and methods of making the same.

One object of this invention is to provide a polygonal convex crystal in which the convex surface is of more perfect form than has heretofore been produced.

Another object of this invention is to provide a polygonal convex crystal in which the polygonal side portions of the crystal extend away from the general plane of the center portion of the crystal at a greater angle than has been true of convex crystals heretofore produced, and in which the side edges are straight.

Another object is to provide an improved method for expeditiously making the foregoing improved crystals.

The preceding and other objects and advantages will appear from the following description, appended claims and accompanying drawing forming a part of this specification.

In the accompanying drawing:

Fig. 1 is a face view of a rectangular piece of flat sheet crystal material from which the convex crystal is to be made;

Fig. 2 is a front edge view of Fig. 1 with the corners removed along lines indicated by the dotted lines in Fig. 1;

Fig. 3 is a front edge view similar to Fig 2 after the crystal has been bent to convex shape;

Fig. 4 is a top plan view of Fig. 3; and

Fig. 5 is an edge view of Fig. 4 taken in the direction of the arrow.

In the particular embodiment of the invention which is illustrated in the drawing, 1 represents a rectangular flat piece of sheet glass or other suitable transparent material having the sides or edges 2.

The corner portions 3 are severed from the piece of glass 1 along lines indicated by the dotted lines 4. The glass is then heated to its softening point and bent or otherwise formed into the convex crystal 5 shown in Figs. 3, 4 and 5.

Due to the removal of the corner portions 3 prior to the bending or convexing operation being performed, the finished crystal 5 can be readily produced of perfect form, and when desired, can readily be formed with the polygonal side portions 6 at a greater angle to the general plane of the center portion 7 of the crystal 5 than is otherwise possible, and with the side portions 6 and the side edges thereof straight.

During this bending or forming operation the straight corner edges 8 of the flat glass piece 1 assume the convexly curved form 9.

It will be appreciated that corner portions of different shape from those illustrated in the drawing can be removed from blanks used to make crystals in accordance with this invention. It will also be appreciated that crystals can be made in accordance with this invention from other materials beside glass, such, for example, as celluloid or pyroxylin.

The finished crystal illustrated in Figs. 3, 4 and 5 is then ready for mounting in a suitably formed bezel.

I claim:

1. A polygonal, convex crystal having substantially straight side-portions provided with substantially-straight side-edges which side-edges are spaced from one another and connected by transverse, convexly-curved corner edges.

2. A generally rectangular, convex crystal having substantially straight side-portions provided with substantially-straight side-edges which side-edges are spaced from one another and connected by transverse convexly-curved corner edges.

3. A generally rectangular, convex crystal having substantially straight side-portions provided with substantially-straight side-edges which side-edges are spaced from one another and connected by transverse convexly-curved corner edges formed by being bent from straight to convexly-curved shape.

4. A generally rectangular, convex crystal having substantially-straight side portions provided with substantially-straight side edges which side edges are spaced from one another and connected by transverse convexly-curved corner edges, and formed by being bent from substantially-flat sheet crystal material of rectangular form with the corners removed, thus leaving the ends of each of the four rectangle side edges well spaced from the adjacent ends of adjacent rectangle side edges.

H. OTTO VOGT.